Figure 1:
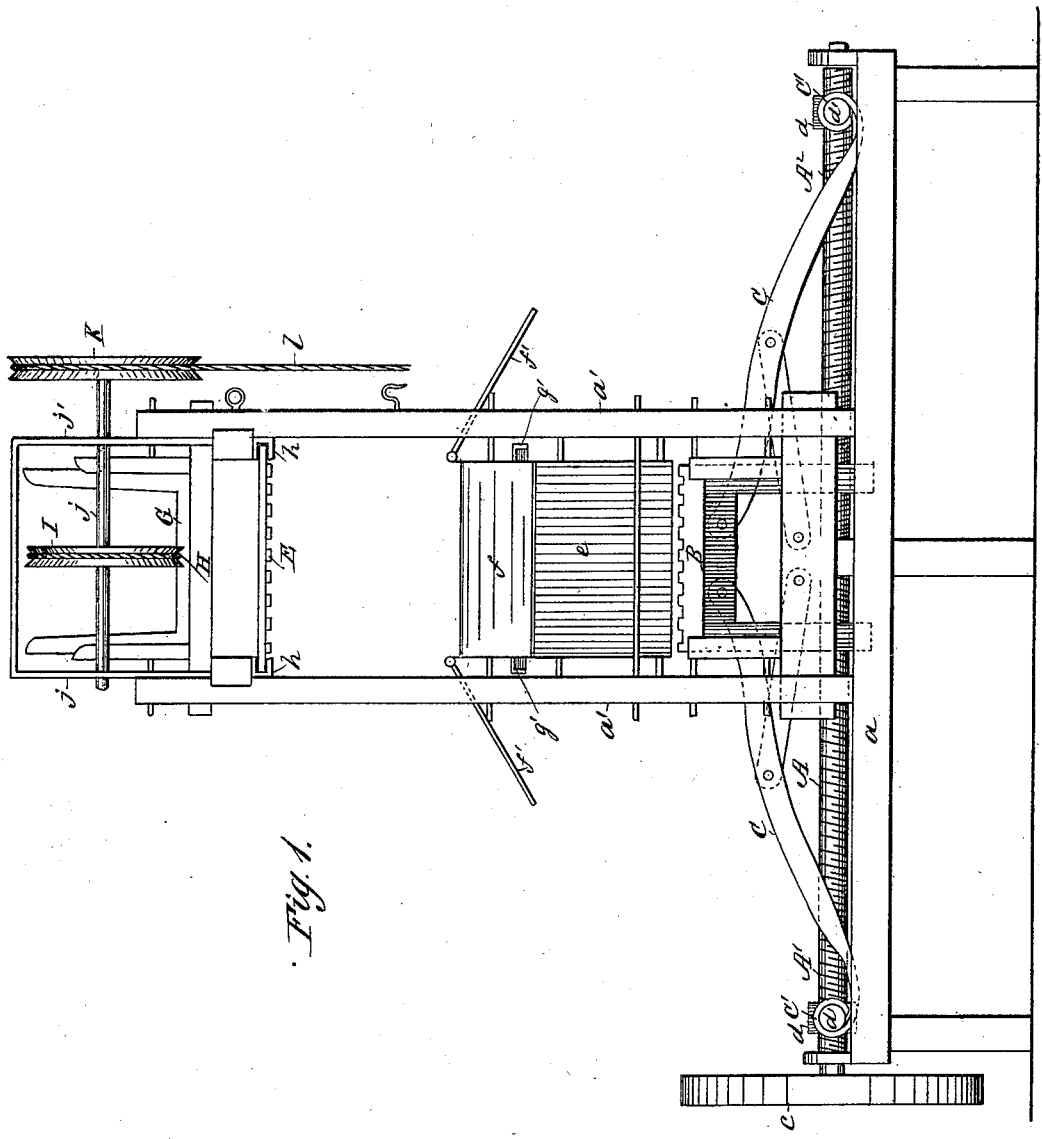

(No Model.) 2 Sheets—Sheet 1.

H. BANKSTON.
HAY OR COTTON PRESS.

No. 264,219. Patented Sept. 12, 1882.

WITNESSES:
W. W. Hollingsworth
Solon C. Kemon

INVENTOR:
H. Bankston
BY
ATTORNEYS.

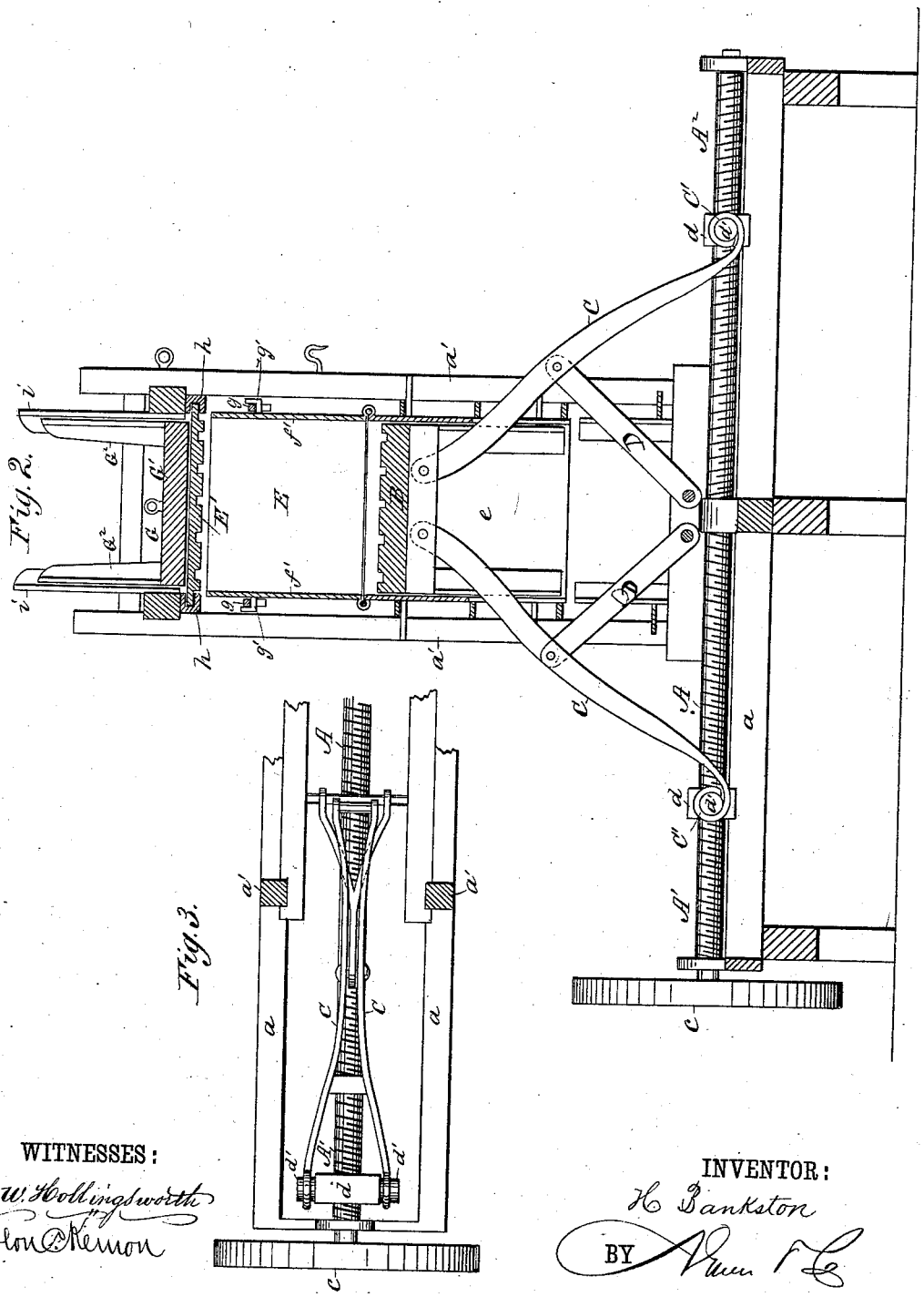

UNITED STATES PATENT OFFICE.

HIRAM BANKSTON, OF FORT SMITH, ARKANSAS.

HAY OR COTTON PRESS.

SPECIFICATION forming part of Letters Patent No. 264,219, dated September 12, 1882.

Application filed June 22, 1882. (No model.)

*To all whom it may concern:*

Be it known that I, HIRAM BANKSTON, of Fort Smith, in the county of Sebastian, in the State of Arkansas, have invented a new and useful Improvement in Hay or Cotton Presses; and I do hereby declare that the following is a full, clear, and exact description of the same, reference being had to the accompanying drawings, forming a part of this specification.

This invention relates to improvements in hay or cotton presses of that class known in the art as "beater" presses, and has for its object to cause the efficient and thorough packing and compressing of the hay or cotton or other material acted on.

The nature of this invention consists in the employment of a right-and-left-hand screw-threaded shaft or screw carrying nuts or cross-bars, to which are applied levers fulcrumed upon articulated or pivoted bars or levers, constituting jointly powerful compound or toggle levers, which act upon a follower or plunger working in a chamber, to the upper edges of which are connected the hinged sides and ends of an extension of the said chamber. Above the aforesaid chamber is arranged a horizontally-sliding head-block. A beater capable of manipulation or operation by suitable means is adapted to act upon the contents of the press-chamber to pack the same previous to being compressed, all constructed substantially as hereinafter more fully set forth.

In the accompanying drawings, Figure 1 is a side elevation of my improved press with the hinged sides and ends of the press-chamber lowered. Fig. 2 is a sectional elevation of the same with the hinged sides and ends of the press-chamber closed. Fig. 3 is a detailed horizontal section thereof.

In carrying out my invention I employ, for convenience in supporting the several parts of my improvement, a horizontal frame, $a$, and an upright frame, $a'$, secured about centrally upon the frame $a$; but as these form no essential part of the invention they may be substituted by other suitable means adapted to effect the same purpose.

A is the shaft or screw, having bearings in boxes affixed to a cross-bar at the middle of the frame $a$ and at is ends, and having at one end a driving pulley or wheel, $c$, which may be driven by any suitable motor. This shaft has a right-hand and a left-hand screw-thread, $A'$ $A^2$, upon which ride screw-threaded cross-bars or nuts $d$.

B is a follower or plunger arranged to move in a chamber or inclosure, $e$, fixed to the upright frame $a'$ a suitable distance above the base-frame $a$.

To the under side of the follower or plunger B are connected the upper ends of levers C, whose opposite ends are each connected to cylindrical studs or trunnions $d'$ at the ends of the cross-bars or nuts $d$. The latter connection is made preferably by forming said ends of levers with loops or eyes $C'$, which embrace the cylindrical studs or trunnions $d'$ of the nuts or bars, so as to allow them to have movement independent of each other to conform to the different planes of movement of the levers and cross-bars or nuts in causing the rotary motion of the screw or shaft to raise and lower or impart a vertical movement to the follower. These levers are fulcrumed upon and form, with pivoted or articulated bars or levers D, powerful compound or toggle levers, which act upon and render the plunger or follower efficient to thoroughly compress the superposed mass of cotton or hay or other material. The levers C are composed each of two bars braced together. The levers D are articulated or pivoted at their lower ends to closely-arranged bars or rods supported in side pieces fixed to the uprights of the frame $a'$ near their lower ends. To the upper edges of the inclosure $e$ are hinged the side and end pieces, $f f'$, constituting the press-chamber E.

Removable bars $g$, with hooked ends, are slipped upon the hooked ends of similar bars, $g'$, fastened to side pieces of the press-chamber to hold the said side and end pieces in a vertical position.

E' is the head-block, supported and adapted to slide in grooved rails $h$, fastened to the uprights of the frame $a'$ near their upper ends. The head-block can be moved in and out of line with the follower or plunger at pleasure, as occasion requires. Both the follower and head-block have grooves to permit the passing around the mass of hay, cotton, or other material of the binding rope or wire before removal from the press-chamber, and preparatory to forming it into a bale.

G is the beater, which consists of a rectangular head, G', having ribs or edgewise-disposed plates on its under side to suitably affect or pack the cotton or hay or other contents of the press-chamber. It consists, further, of standards or arms G², extended upward from the head, and guided in their movement by triangular shaped or grooved guides $i$, one fastened to each of the four uprights of the frame $a'$.

To the center of the upper side of the head G' of the beater is attached one end of a cord or chain, H, attached at its opposite end to a pulley, I, secured to a shaft, $j$, hung in uprights $j'$, fastened to the frame $a'$. Upon the same shaft, $j$, is fixed a second pulley, K, to which is connected an operating cord or chain, $l$. The cord or chain $l$ is so attached to its pulley K that as a downward pull is exerted thereon, rotating pulley K, the pulley I will be rotated, so as to wind up its cord or chain, the purpose of which will presently appear.

The cord or chain $l$ is wound a number of times around its pulley, so that a downward pull thereon, which effects the unwinding thereof, causes the rotation of its pulley and shaft. This in turn causes the rotation of the pulley I and the winding up thereon of the cord or chain H, enabling the lifting of the beater.

It will be noticed that as the cotton or hay or other material to be baled is put into the press-chamber, its hinged sides and ends being closed and secured, as above stated, it is subjected to the pounding action of the beater, causing the packing thereof by imparting a series of upward and downward movements to the beater, which is effected by alternately pulling upon and releasing the cord or chain $l$. After the packing of the contents of the press-chamber the head-block E, previously slid to one side upon its rails, is moved in line with and caused to cover the press-chamber. The follower or plunger B is now caused to move upward and act upon the contents of the press-chamber by rotating or driving to the right the pulley on the screw-shaft whose nut carries the levers that act upon said follower. The said contents of the press-chamber are thus subjected to pressure between the follower and the head-block, said operation being continued until they have been thoroughly and tightly compressed. When this operation is completed the hinged ends and sides of the press-chamber are lowered or opened to permit the binding and forming the contents of the press-chamber into a bale preparatory to its removal from the press. The follower is now caused to descend by reversing the rotation of the pulley upon the screw-shaft, when the removal of the bale can be effected.

Having thus described my invention, what I claim, and desire to secure by Letters Patent, is—

1. In a baling-press, the combination, with the follower B and the right-and-left-hand screw-shaft A, of the threaded cross-bars or nuts $d$, provided with trunnions $d'$ at their ends, the levers C, having loops C' at their lower ends, surrounding the trunnions, and pivoted at their upper ends to the follower, and arms D, pivoted at their lower ends to the base of the frame and at their upper ends to the levers C, substantially as and for the purpose set forth.

2. In a baling-press, the combination, with the upright frame having guides, one at each corner, of the beater having upwardly-extended arms at its corners, and a cord or chain passed around a pulley fixed to a shaft having a second pulley, to which is attached also a chain or cord, substantially as and for the purpose specified.

3. In a baling-press, the combination, with the press-chamber having the hinged sides and ends capable of being held together, of the follower and its operating-levers and screw-shaft, and the sliding head-block, substantially as and for the purpose described.

HIRAM BANKSTON.

Witnesses:
J. H. CARROLL,
AUGUST REICHERT.